United States Patent [19]
Bergmann et al.

[11] Patent Number: 5,973,860
[45] Date of Patent: Oct. 26, 1999

[54] ROTATABLE CYLINDRICAL ELEMENTS FOR OPTICAL ALIGNMENT

[75] Inventors: Ernest Eisenhardt Bergmann, Borough of fountain Hill; Sun-Yuan Huang, Blandon, both of Pa.

[73] Assignee: Lucent Technologies Inc., Murray Hill, N.J.

[21] Appl. No.: 09/047,553

[22] Filed: Mar. 25, 1998

[51] Int. Cl.⁶ .............................. G02B 7/02; G02B 14/08; G02B 6/36
[52] U.S. Cl. ........................... 359/811; 359/136; 385/88; 385/89
[58] Field of Search ..................................... 359/811, 136; 385/88, 49, 89

[56] References Cited

U.S. PATENT DOCUMENTS 5,881,198  3/1999  Haake ...................................... 385/136

*Primary Examiner*—Georgia Epps
*Assistant Examiner*—Michael A Lucas

[57] ABSTRACT

An apparatus which routes light generated by a light source to a remote destination. The apparatus includes a cylindrical optical element defining a longitudinal axis. The element has an end face which is oblique relative to the longitudinal axis. The end face routes light by refraction or reflection. A support having a support surface is provided for positioning the optical element between the source and the destination so that the longitudinal axis of the element is substantially parallel to the support surface. The support substantially prevents rotational movement of the optical element about an axis extending normal to the support surface while allowing rotational movement of the optical element about its longitudinal axis so that the direction of the light routed by the end face can be selectively and continuously changed as a function of the rotation of the optical element.

20 Claims, 3 Drawing Sheets

ROTATABLE CYLINDRICAL ELEMENTS FOR OPTICAL ALIGNMENT

FIELD OF INVENTION

The present invention relates to an apparatus for routing light between a light source and a remote destination.

BACKGROUND OF THE INVENTION

Optical systems used in conventional telecommunication systems typically include a light source which supplies light that must be properly directed to a remote destination. Typically, the light source is a laser diode or an optical fiber, and the destination is a light detector or an optical fiber. Proper routing of the light requires that the light source and the remote destination be properly aligned with one another.

Proper alignment of such systems has been conventionally accomplished by repositioning the light source and/or the remote destination. Such repositioning may require re-melting the solder used for bonding the light source and/or the remote destination to an associated supporting structure. Typical lateral positioning tolerances for optical elements such as a laser diode are on the order of approximately 1 $\mu$m or less. Due to such small tolerances, the laser diode and an accompanying collimating lens must be carefully bonded to a support structure to ensure that they are properly aligned. If the laser diode is positioned with a lateral control of 2 $\mu$m and used with a 1 $\mu$m focal length collimating lens, the pointing error can typically be 2 milliradians (vertically and horizontally).

However, even when the pointing error of the light source is controlled, the pointing error of the destination may also need to be controlled. For instance, if the destination is a collimating lens and a single-mode fiber, light from a second light source may be directed backward through the fiber and the collimating lens towards the first light source to ensure proper alignment of this first light source and the destination. If the pointing error of the collimating lens and single-mode fiber is not controlled, the light from this second light source will not reach the first light source. Accordingly, there is a need for an apparatus which adjusts for pointing errors both near a light source and a destination so that the light is properly routed from the source to the destination without having to reposition the source and/or the destination.

SUMMARY

In accordance with the present invention, an apparatus routes light generated by a light source to a remote destination. The apparatus eliminates repositioning of the light source and/or destination. The apparatus comprises a cylindrical optical element defining a longitudinal axis. The element has an end face which is oblique relative to the longitudinal axis. The end face routes light by refraction or reflection. A support having a support surface is provided for positioning the optical element between the source and the destination so that the longitudinal axis of the element is substantially parallel to the surface. The support substantially prevents rotational movement of the optical element about an axis extending normal to the surface while allowing rotational movement of the optical element about its longitudinal axis so that the direction of the light routed by the end face can be selectively and continuously changed as a function of the rotation of the optical element.

BRIEF DESCRIPTION OF THE DRAWINGS

A more complete understanding of the present invention may be obtained from consideration of the following detailed description in conjunction with the accompanying drawings in which.

DETAILED DESCRIPTION OF THE INVENTION

Figure 1A:
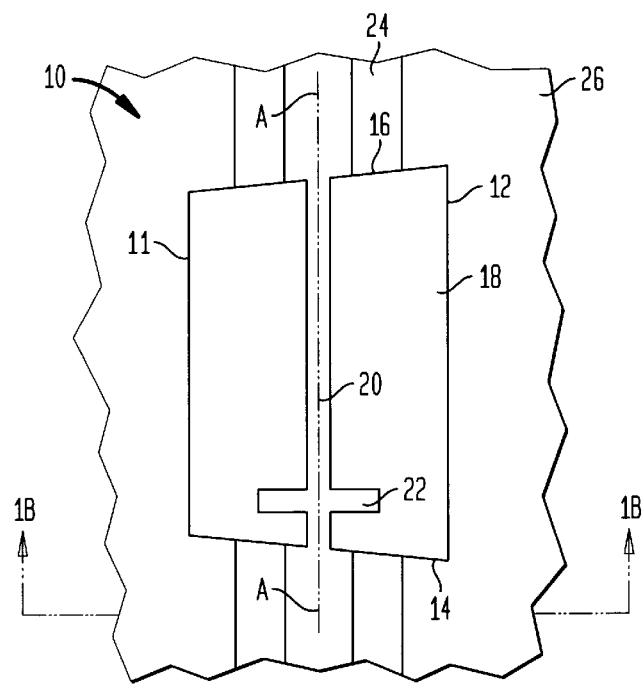
FIG. 1A is a top plan view of an apparatus for optically aligning light rays according to an embodiment of the present invention, wherein this apparatus includes a support for precisely positioning an optical element on a support surface.

FIG. 1A is a top plan view of an apparatus 10 for optically aligning light rays according to an embodiment of the present invention. The apparatus 10 comprises an optical element 11 and a support 24 for locating the optical element 11 on a support surface 26. All of the other supports described herein, including support 24, are commonly formed in silicon during the fabrication of apparatus 10 as V-shaped grooves, although they need not be so shaped.

The optical element 11 comprises a solid cylindrical body 12 which defines a longitudinal axis A therethrough. The body 12 includes a cylindrical side surface 18 and first and second end faces 14, 16. The first and second end faces 14, 16 are oblique to the longitudinal axis A. The minimum angle of obliqueness is approximately $\frac{1}{10}°$. The cylindrical side surface 18 may include one or more optional slots which can used for moving and identifying the element as will be explained further on. In the embodiment of FIG. 1A, the cylindrical side surface 18 includes a first slot 20 and a second slot 22. The first slot 20 may extend from the first and second end faces 14, 16, respectively, and second slot, 22 may extend transverse to the first slot 20.

The cylindrical body 12 of the optical element 11 may be made from optically transparent materials which are used for light transmission or light reflection. When the optical element 11 is used in light reflection applications only, the cylindrical body 12 may be made from optically non-transparent materials. First end face 14 is always used optically and is therefore polished and coated with an appropriate optical coating. Typically, however, both the first and second end faces 14, 16 are optically used and are therefore, polished. Depending upon the optical use, the optical coatings may include anti-reflecting, high reflectivity, dichroic, and beam-splitting coatings.

Figure 1B:
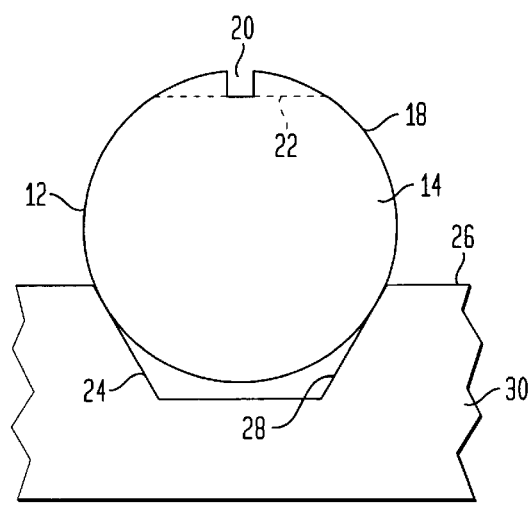
FIG. 1B is a cross-sectional view through line 1B—1B of the apparatus shown in FIG. 1A.

FIG. 1B is a cross sectional view through line 1B—1B of FIG. 1A. The support 24 is comprised of a groove 28 etched into the support surface 26 of a substrate 30 such as a silicon wafer. The support 24 precisely locates the optical element 11 on the support surface 26 and prevents the optical element 11 from rotating about an axis which is normal to the optical element's longitudinal axis A.

Figure 2:
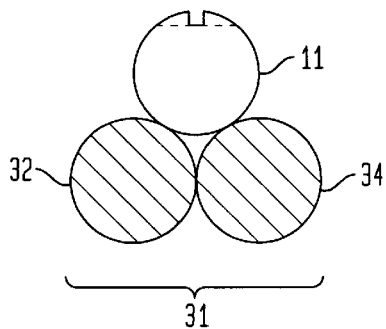
FIG. 2 shows a second type of support.

FIG. 2 shows a second type of support 31 for precisely locating the optical element on a support surface. The support 31 is comprised of two cylinders 32, 34. The supports 24, 31 described above make rigid contact along at least two lines of the cylindrical side surface 18 of the element 11. Consequently, movement of the optical element 11 is limited to rotation about the element's longitudinal axis A and linear translation along the element's longitudinal axis A.

Figure 3A:
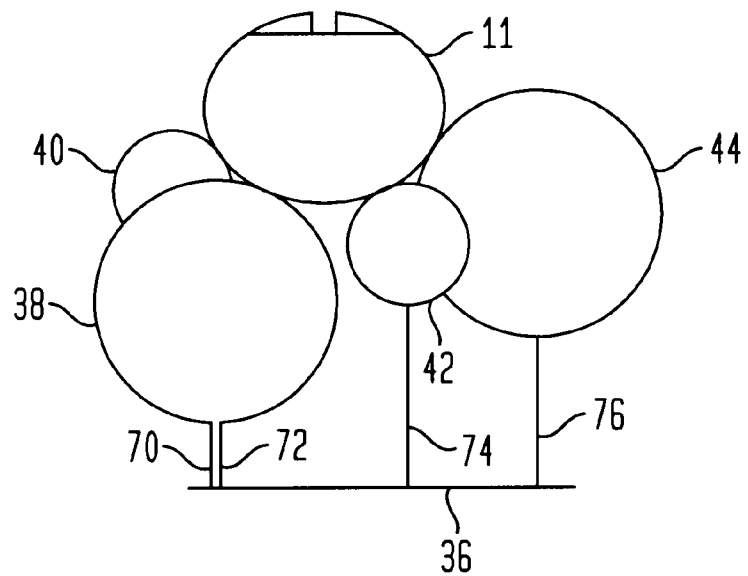
FIG. 3A is an end view of a third type of support.
Figure 3B:
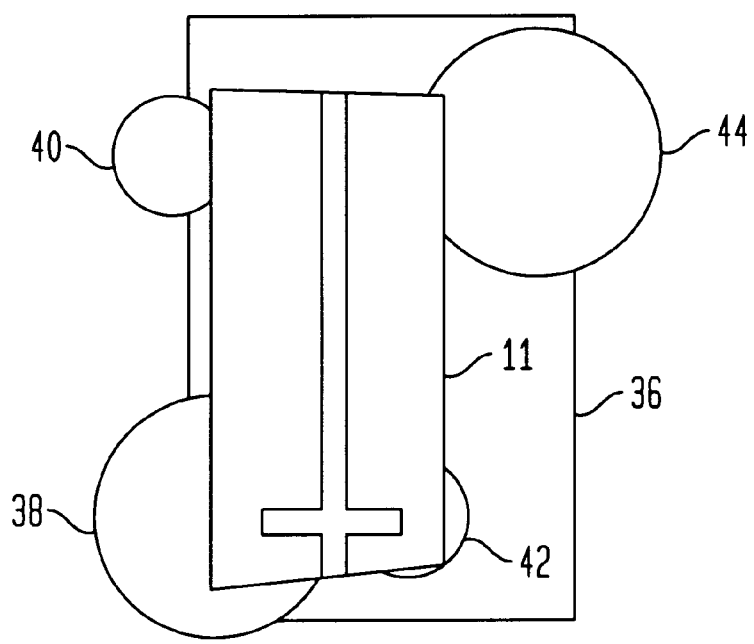
FIG. 3B is a top plan view of the third type of support shown in FIG. 3A.

FIGS. 3A and 3B show a support 36 comprised of four asymmetrically arranged, differently-sized spheres 38, 40, 42, 44 for making at least four (4) points of rigid contact with the side surface 18 of the optical element 11. Spheres 38, 40, 42, 44 are coupled to support 36 by columns 70, 72, 74 and 76. This type of support also limits the movement of the element 11 to rotation about the element's longitudinal axis A and linear translation along the element's longitudinal axis A. It should be understood that more than four spheres may be used as a support. The spheres may also be of the same size and may be symmetrically arranged. Other forms of support are possible as well, such as combinations of flat, cylindrical, spherical and/or other shaped surfaces.

By providing at least one of the end faces 14, 16 of the optical element 11 which is oblique to the element's longitudinal axis A, the rotational degree of freedom afforded by the support can be used to cause the orientation of that end face to "wobble" or undergo a small, controlled change in tilt (relative to an incident light ray) in response to rotation of the element. Accordingly, the direction of a light ray being refracted by or reflected from that end face will be changed slightly and continuously as a function of element's rotation. The optional slots 20, 22 facilitate rotation and linear translation of the element 11 by a tool or instrument and allow the rotational degree of the element 11 to be easily estimated. The shapes and orientations of slots 20, 22 shown in FIG. 1A can also be used to identity and distinguish elements 11, 14 and 16 from one another, in the same manner that color coding was once used to distinguish resistors of differing value from one another.

Since the support is able to precisely control the element's longitudinal axis A by preventing rotations about an axis normal to the support surface, the apparatus 10 can control light by reflection. By comparison, mounting mirror-containing optical components on a substantially flat support surface allows in-plane rotations about an axis normal to the substantially flat support surface.

If two or more optical elements are used, two or more forms of adjustment can be made upon a light ray that passes through the elements and is refracted by passage through the element's end faces. These elements may share a common support or use different supports. Four types of ray adjustments are typically required: vertical and horizontal pointing or tilting, and vertical and horizontal translation. These four types of ray adjustments can be made to a light ray by succession through four optical elements as will be explained below. Optical elements with reflecting end faces can also be included for providing degrees of adjustment. If the light ray is making a noticeable angle to the end face of an element, it is also possible to make slight translations of the ray by linearly moving the element along its longitudinal axis.

Figure 4:
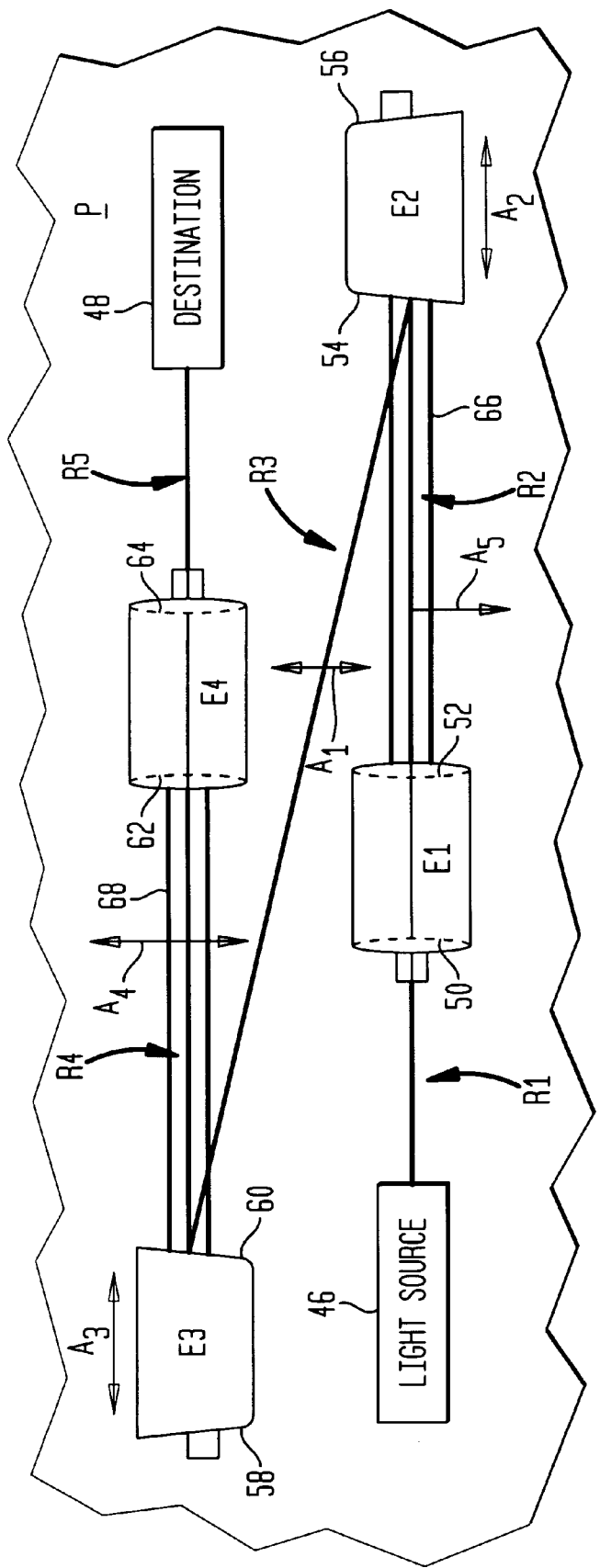
FIG. 4 is a top plan view which illustrates the use of the apparatus of the present invention.

FIG. 4 illustrates an exemplary use of the apparatus to align a light ray R1. First, second, third and fourth optical elements E1, E2, E3, E4 are provided for aligning a light ray R1 traveling from a fixed light source 46 to a fixed destination 48 which is remote from the light source 46. Each of the optical elements E1, E2, E3, E4 have first end faces 50, 54, 58, 62 and second end faces 52, 56, 60, 64 at least one of which is oblique to the longitudinal axis of the optical element. The optical elements E1, E2, E3, E4 may be oriented with their longitudinal axis in a common plane P (plane of the drawing). The first and second optical elements E1 and E2 may be disposed in a first elongated support 66 and the second and third optical elements E3 and E4 may be disposed in a second elongated support 68. The first and second supports 66, 68 may be parallel to each other.

The light ray R1 is converted by refraction to a second light ray R2 as it passes through the first optical element E1. The second light ray R2 is converted by reflection to a third light ray R3 as it reflects off the first end face 54 of the second optical element E2. In turn, the third light ray R3 is converted by reflection to a fourth light ray R4 as it reflects off the second end face 60 of the third optical element E3. The fourth light ray R4 is converted by refraction to a fifth light ray R5 as it passes through the fourth optical element E4.

The first end face 54 of the second optical element E2 and the second end face 60 of the third optical element E3 are used as mirrors for reflection. The unused end faces 56, 58 of the second and third optical elements E2, E3 may be left unpolished as a cost saving measure and/or way to distinguish these elements from the first and second optical elements E1, E4 during handling and assembly. However, these unused faces need not be oblique to the cylindrical axis. Moreover, the second and third optical elements E2, E3 can be made from an optically non-transparent material, thereby providing a further flexibility of choice. Since any instability in the orientation of the second and third optical elements E2, E3 will affect mirror orientation, it is advantageous to lengthen the second and third optical elements E2, E3 to take advantage of the elongated first and second supports 66, 68.

The mirror surfaces 54, 60 are oriented to redirect the light ray R1 primarily in a Z-like path relative to the plane P. With the second ray R2 fixed, the third ray R3 can be translated in the plane P in the direction of arrow A1 (without changing the third ray's direction) by translating the second optical element E2 in the direction of the second arrow A2. Similarly, not changing the third ray R3 and translating the third optical element E3 in the direction of arrow A3 will cause the fourth ray R4 to translate in the direction of arrow A4 (without changing the fourth ray's direction).

For purposes of the following description, it is assumed that a viewer is positioned in plane P of FIG. 4 such that optical element E3 is closest to the viewer and the destination is furthest away from the viewer. Holding the second ray R2 fixed and rotating the first end face 54 of the second optical element E2 clockwise causes the third ray R3 to reflect or tilt (vertically) out of the plane P. Counter-clockwise rotation of the first end face 54 of the second optical element E2 causes the third ray R3 to reflect or tilt (vertically) into the plane P. Holding the third ray R3 fixed and rotating the second end face 60 of the third optical element E3 clockwise or counter-clockwise causes similar adjustments in the vertical tilt (relative to the plane P) of the fourth ray R4.

When the two reflecting end faces 54, 60 of the second and third optical elements E2, E3 are made parallel to each other, the vertical tilts of the second and fourth rays R2 and R4 will match and the second and fourth rays R2 and R4 will be parallel to each other. If the second ray R2 is fixed and the second and third optical elements E2, E3 are simultaneously rotated so that the reflecting end faces 54, 60 remain parallel to each other, the fourth ray R4 will remain parallel with the second ray R2. However, the fourth ray's R4 height above or below the plane P will change. Accordingly, rotation of the second and third optical elements E2, E3 (without translation) can be used to control the vertical tilt and height of the fourth ray R4 (above and below the plane P) relative to the second ray R2.

Turning to the effects of the first and fourth optical elements E1, E4, assume the end faces 50, 52, 62, 64 of the first and fourth optical elements E1, E4 tilt toward the plane P. It will be understood, however, that not all of the end faces have to be so oriented. If the index of refraction of the first and fourth optical elements E1, E4 is greater than the surrounding medium (1.5 versus 1.0), the first and fourth optical elements E1, E4 will respectively refract or bend the first and fourth rays upward above the plane P.

If the first ray R1 is parallel to the plane P, then it will be refracted by the first end face 50 of the first optical element E1 so that it rises slightly out of the plane P. As the first ray R1 exits from the first optical element E1 as the second ray R2, the tilt of the second end face 52 will further refract the ray above the plane P. Holding the first ray R1 fixed and rotating the first optical element E1 clockwise causes the second ray R2 to rotate in the direction of arrow A5. This initial change primarily affects the horizontal (in-plane) component of ray tilting and not the vertical (out of the plane) component of ray tilting.

Identical observations can be made for the fourth and fifth rays R4, R5 with the fourth optical element E4. Therefore, rotations of the first and fourth optical elements E1, E4 allow both the position and direction of the fifth ray in Plane P to be adjusted relative to the first ray R1. Since the first and fourth optical elements E1, E4 are used in the transmission of rays R1 and R2 whereas optical elements E2, E3 are used in the reflection of rays, it then follows, as is well known in the art, that the mounting stability requirements for transmissive optical elements E1, E4 will be less demanding than for reflective optical elements E2, E3.

If the reflection angles produced by the mirrors of the second and third optical elements E2, E3 are much larger than the refraction angles produced by the first and fourth optical elements E1, E4, vertical tilts introduced by the first and fourth optical elements E1, E4 can be compensated for by rotating the second and third optical elements E2, E3. Thus, if the first ray R1 is initially at or below the first support and parallel to the plane P, the rise in the second ray's R2 tilt moves it out of the support as the second ray R2 reaches the second optical element E2. The reflection of the second ray R2 by the second optical element E2 can make the third ray R3 parallel again to the plane P (the vertical tilt being canceled) but the height of the third ray R3 is adequate to skip above the support to reach the third optical element E3. Reflection by a suitably oriented third optical element E3 causes the fourth ray R4 to descend into the second support and be brought again parallel to the plane P by the fourth optical element E4.

Accordingly, as shown above, the optical elements E1, E2, E3, E4 can be used for achieving vertical and horizontal tilt, and vertical and horizontal translation of the fifth ray R5 relative to the first ray R1.

It should be understood that the embodiments described herein are merely exemplary and that a person skilled in the art may make many variations and modifications to these embodiments utilizing functionally equivalent elements to those described herein. Any and all variations or modifications which may become apparent to those skilled in the art are intended to be included within the scope of the invention as defined by the appended claims.

What is claimed is:

1. An apparatus for routing light supplied by a light source to a destination, comprising:
   an optical element defining a longitudinal axis, the optical element having an end face which is oblique relative to the longitudinal axis, the end face being configured for routing light by one of refraction and reflection; and
   a support having a support surface for positioning the optical element between the source and the destination so that the longitudinal axis is substantially parallel to the support surface, the support substantially preventing rotational movement of the optical element about an axis extending normal to the support surface while allowing rotational movement of the optical element about its longitudinal axis so that the direction of the light routed by the end face can be selectively and continuously changed as a function of the rotation of the optical element.

2. The apparatus according to claim 1, wherein the end face is optically polished.

3. The apparatus according to claim 2, wherein the end face is coated with an optical coating.

4. The apparatus according to claim 1, wherein the optical element has a second end face which is oblique relative to the longitudinal axis.

5. The apparatus according to claim 4, wherein the second end face is optically polished.

6. The apparatus according to claim 5, wherein the second end face is coated with an optical coating.

7. The apparatus according to claim 4, wherein the second end face is configured for routing light by one of refraction and reflection and the first and second end faces are each optically polished.

8. The apparatus according to claim 7, wherein the first and second end faces are each coated with an optical coating.

9. The apparatus according to claim 1, wherein the optical element includes at least one slot.

10. The apparatus according to claim 1, wherein the support makes at least four points of rigid contact with the optical element.

11. The apparatus according to claim 1, wherein the optical element is optically transparent.

12. The apparatus according to claim 1, wherein the support further allows linear movement of the optical element along its longitudinal axis so that the direction of the light routed by the end face can be selectively and continuously changed as a function of the linear movement of the optical element.

13. The apparatus according to claim 1, further comprising at least a second optical element defining a second longitudinal axis, the second optical element having an end face which is oblique relative to the second longitudinal axis, the end face of the second optical element being configured for routing light by one of refraction and reflection, the second optical element being positioned on the support surface.

14. The apparatus according to claim 13, further comprising a third optical element defining a third longitudinal axis and a fourth optical element defining a fourth longitudinal axis, the third optical element having an end face which is oblique relative to the third longitudinal axis and the fourth optical element having an end face which is oblique relative to the fourth longitudinal axis, the end faces of the third and fourth optical elements being configured for routing light by one of refraction and reflection.

15. The apparatus according to claim 14, further comprising a second support having a support surface for positioning the third and fourth optical elements between the light source and the destination so that the third and fourth longitudinal axis are substantially parallel to the support surface of the second support, the second support substantially preventing rotational movement of the third and fourth optical element about an axis extending normal to the support surface of the second support while allowing rotational movement of the third optical element about the third longitudinal axis so that the direction of the light routed by the end face of the third optical element can be selectively and continuously changed as a function of the rotation of the third optical element, and while allowing rotational movement of the fourth optical element about the fourth longitudinal axis so that the direction of the light routed by the end face of the fourth optical element can be selectively and continuously changed as a function of the rotation of the fourth optical element.

16. The apparatus according to claim 15, wherein the second support further allows linear movement of the third optical element along the third longitudinal axis and allows linear movement of the fourth optical element along the fourth longitudinal axis so that the direction of the light routed by the end face of the third optical element can be selectively and continuously changed as a function of the linear movement of the third optical element, and so that the direction of the light routed by the end face of the fourth optical element can be selectively and continuously changed as a function of the linear movement of the fourth optical element.

17. The apparatus according to claim 1, wherein the optical element is cylindrical in shape.

18. The apparatus according to claim 14, wherein the second optical element is cylindrical in shape.

19. The apparatus according to claim 15, wherein the third and fourth optical elements are cylindrical in shape.

20. A method for routing light supplied by a light source to a destination, comprising the steps of:

providing an optical element defining a longitudinal axis, the optical element having an end face which is oblique relative to the longitudinal axis, the end face being configured for routing light by one of refraction and reflection;

providing a support having a support surface for positioning the optical element between the source and the destination so that the longitudinal axis is substantially parallel to the support surface; and utilizing the support to prevent rotational movement of the optical element about an axis extending normal to the support surface while allowing rotational movement of the optical element about its longitudinal axis so that the direction of the light routed by the end face can be selectively and continuously changed as a function of the rotation of the optical element.

* * * * *